Jan. 8, 1935.  A. DI GIULIO  1,987,184
HYGIENIC AND SAFETY BOTTLE COVER
Filed Oct. 2, 1931
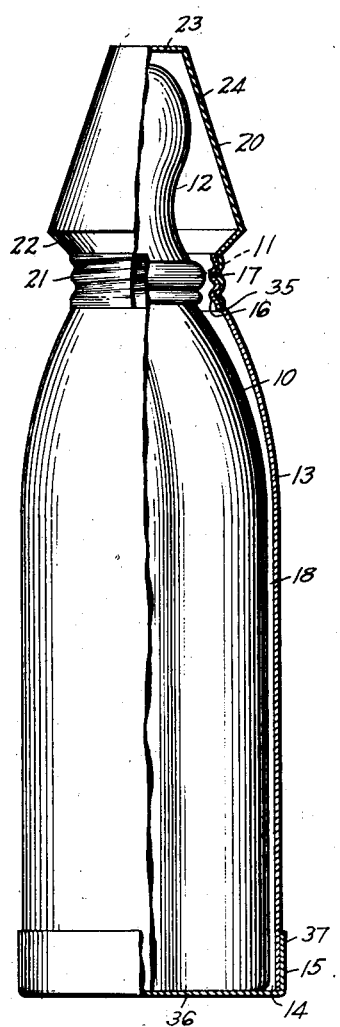
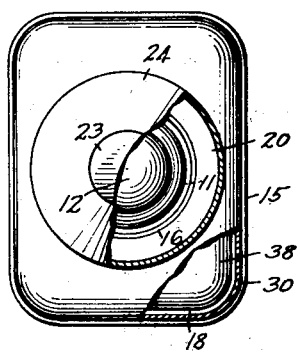
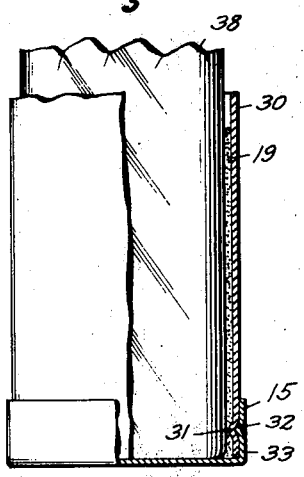
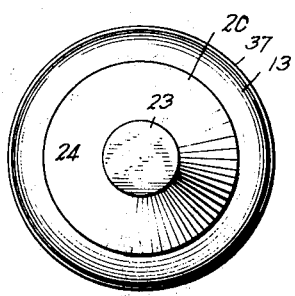
INVENTOR
*Angelo Di Giulio*
BY
*Harry Jacobson*
ATTORNEY Patented Jan. 8, 1935

1,987,184

UNITED STATES PATENT OFFICE 1,987,184

HYGIENIC AND SAFETY BOTTLE COVER

Angelo Di Giulio, Lodi, N. J.

Application October 2, 1931, Serial No. 566,538

5 Claims. (Cl. 215—12)

This invention relates to sanitary safety bottle covers and particularly, to that type designed to protect babies' milk bottles.

Heretofore, such bottles and the flexible nipples therefor have been inefficiently protected, if at all. Due to the lack of protection, the nipple has been subjected to contamination by disease germs and dirt, which frequently enter the baby's mouth through the contaminated nipple when the baby is fed. Furthermore, such bottles when unprotected are a source of danger, since being customarily made of glass, they frequently break when dropped and are liable to cause injury by reason of flying glass fragments, and to make an unsightly mess difficult to clean up because of the broken glass and spilt milk. Furthermore, the heat of the warm milk in the bottle, when unprotected, is rapidly dissipated through the exposed glass bottle, so that the milk rapidly falls below the proper temperature at which it should be fed to the infant.

My invention therefore contemplates the provision of means for adequately protecting the nipple against the access of bacteria, dirt or other extraneous matter, and for so confining and protecting the bottle that the danger of breakage thereof when dropped is minimized, and the heat better retained therein. My invention further contemplates the provision of means for encasing and protecting both the nipple and bottle to prevent the flying of glass fragments and the spattering of the contents should the bottle be nevertheless accidentally broken.

The various objects of my invention will be clear from the description which follows, and from the drawing, in which, Fig. 1 is a partial elevation and partial vertical section of one form of a baby's milk bottle to which my invention has been applied.

Fig. 2 is a top plan view of the same.

Fig. 3 is a similar view, partly in horizontal section, of a modified form of bottle and of my improved casing therefor, and Fig. 4 is a partial front elevation and partial vertical section of Fig. 3, showing the lower part of the bottle and of my improved casing and cushion thereof.

In that practical embodiment of my invention which I have illustrated by way of example, the milk bottle 10 may be of circular cross-section and made of glass, and provided with the usual bead 11 over which the flexible nipple 12 made of rubber or the like, as is well known, may be stretched. It will be understood, however, that my improved cover may be applied to bottles of any shape.

In order to protect the bottle proper, I provide a preferably metallic casing at 13, shaped to conform generally to the shape of the bottle and made preferably, of suitable sheet material such as sheet aluminum or the like to reduce the weight thereof to a minimum. The casing 13 is open at its lower end 14 but said lower end is normally closed by the tight fitting cap 15 after the bottle has been inserted thereinto. Said cap, while a tight fit on the lower end of the casing 13, is nevertheless removable when the bottle is to be removed or the parts disassembled for cleansing, filling or sterilizing purposes. The cap 15 comprises a preferably flat bottom 36 adapted to support the bottle 10 and the cylindrical flange 37. At its upper end, the casing 13 is provided with the threaded portion 16, the threads 17 of which may be rolled or otherwise formed in a manner well known in the art, a shoulder as 35 being provided just below the threads. The casing 13 is preferably of slightly greater diameter than that of the bottle 10, so that said bottle with the nipple 12 thereon may be readily inserted into the casing through the open end 14 thereof, and so that an air space as 18 is provided between the bottle and the inner surface of the casing. It will be understood that said air space is comparatively small so that the bottle does not rattle within the casing.

It will further be understood that the space 18 may be filled with a yieldable and comparatively soft removable cushion or hollow pad as 19, (Fig. 4) which lining or air space acts as an insulator to prevent radiation of the heat from the bottle or from the contents thereof, while at the same time acting as a shock absorber to lessen the danger of breakage should the bottle with the casing fall to the ground.

The separable nipple protector 20 is provided with the threaded portion 21 engaging the threaded portion 16 of the casing. Said nipple protector or upper cap is preferably of double conical form, being provided with a lower conical portion 22 above the threaded portion, which portion 22 tapers outwardly and upwardly to insure that the cap does not contact with the nipple or with the bead of the bottle. The nipple protector 20 terminates preferably in the flat top 23, said top being connected to the conical portion 22 by the conical portion 24 which tapers downwardly and outwardly to join the upper part of the conical portion 22.

It will be understood that while the bottle 10 with the nipple thereon is carried about, the cap 20 is in its operative position, as illustrated in Fig. 1, wherein the threads 21 thereof engage the threads 16 of the casing and the cap is screwed down to engage the shoulder 35. When, however, it is desired to feed the infant, the cap is unscrewed to expose the nipple, which has in the meantime been fully protected by the cap. Should the bottle be dropped by the infant, the casing 13 and cover 15 act to lessen the danger of breakage of the bottle, but in case of breakage, it will be seen that the fragments of the bottle are nevertheless retained within the casing as is the liquid contents of the bottle, so that the contents cannot be spattered about, nor can there be any possibility of glass fragments flying about and causing injury to persons in the vicinity. If, however, the removable soft pad or lining 19 is used, it will be seen that the danger of breakage of the bottle is substantially lessened so that in most cases, the bottle will not break even when dropped from a substantial height.

As shown in Figs. 3 and 4, my invention has been applied to a bottle 38 of substantially rectangular cross-section having rounded corners. The casing 30 is therefore similarly made substantially rectangular in cross-section but the cap 20 is preferably made of substantially the same shape as that described in connection with Fig. 1. It will be understood that the casings 13 and 30 may be made of any desired shape to conform to bottles of corresponding shape such as hexagonal, octagonal, square or the like. It will further be understood that means may be provided for holding the cap 15 securely in position until manually removed from the casing to allow the removal of the bottle therefrom. As shown in Fig. 4, for example, the casing 30 may be provided with a recess as 31 into which the projection 32 is adapted to spring when the flange 33 is inserted in place on the end of the casing. The projection 32 entering the recess 31, in addition to the friction between the flange 33 and the casing resists removal of the cap from the casing and insures the retention of the parts in their proper operative positions. It will be understood that where the insulating lining 19 is used, said lining is readily removable from the inside of the casing after the bottle has been removed therefrom. The entire casing cover and cap may then be sterilized as by boiling or the like and the sterilized bottle and nipple with the warm milk inserted into the sterilized casing whereafter the cap and cover may be assembled thereon, with or without the lining 19.

It will be understood that the bottle and nipple being completely sealed by my improved cover, they may be maintained in a sterilized condition substantially indefinitely or until it is desired to feed the infant. The casing aids in retaining the heat within the contents of the bottle and also aids in lessening the danger of breakage of the bottle as has been heretofore explained. It will be understood further that while I prefer to make my improved cover of sheet metal such as aluminum suitably plated or polished if desired, any other suitable material such as celluloid, bakelite or the like may be used therefor as may be found convenient or desirable.

It will be seen that I have provided a simple, economical and efficient device designed to maintain infants' feeding bottles and nipples therefor in a hygienic condition, that the various objects of the invention are well attained, and that my invention is well adapted to meet the severe requirements of practical use.

While I have shown and described certain specific embodiments of my invention, I do not wish to be understood as limiting myself thereto but intend to claim my invention as broadly as may be permitted by the state of the prior art and the scope of the appended claims.

I claim:

1. The combination with an infant's glass feeding bottle having a single bead thereon arranged at the upper end thereof and a rubber nipple stretched over the bead, of a protective covering for the bottle and the nipple free and independent of said bottle and the nipple comprising a one-piece metallic casing open at both ends and shaped to conform to the shape of the lateral surface of the bottle, the upper end of said casing being adjacent the bead and threaded and being of less diameter than any other part of the casing, a stop shoulder at the lower extremity of the threaded upper part of the casing, smooth, undistorted curved portion below and joining the stop shoulder to the remainder of the casing and integral therewith, a metallic cap adapted to close the lower end of the casing, said cap comprising a flat bottom adapted to support the bottle and an integral smooth cylindrical flange of a single thickness of material adapted to slide over the lower end of the casing and to be retained thereon frictionally, said cap being removable from the casing to open the lower end of the casing to provide the only opening for the insertion of a bottle into the casing, and a metallic upper cap for the upper end of the casing, said cap being of sufficient length and diameter to be spaced at all points from the nipple and thus to provide an air space completely around the lateral surface of the bottle and said nipple, said cap comprising a flat top, a conical portion tapering downwardly and outwardly from the top, a second conical portion integral with the first mentioned conical portion and tapering downwardly and inwardly, said upper cap being of its greatest diameter and providing a comparatively sharp edge at the junction of said conical portions to provide a finger grip for manipulating the cap, and a terminal threaded portion joined to the second conical portion on the upper cap and adapted to engage said shoulder when said upper cap is screwed on to the threaded portion of the casing.

2. A hygienic and safety cover, adapted to be applied to a glass infant's feeding bottle and nipple for their hygienic protection, and to prevent scattering of glass on the accidental breakage of the bottle, comprising a one-piece metallic casing open at both ends and free and independent of the bottle and nipple to provide an air space around the entire lateral surface of the bottle and nipple, one end of said casing being constricted and externally threaded and of a diameter less than that of any other part of the casing, said casing being cylindrical except at said one end and completely open and unconstricted at the other end, to permit the insertion of said bottle and nipple into the casing only through said other end by axial movement relatively to the casing, a closure cap adapted to be attached to and detached from said one end by axial movement thereof relatively to the casing, the casing having an annular recess adjacent the unconstricted end thereof, an annular projection on the closure cap adapted to spring into the recess for maintaining the cap on the casing, said closure cap normally supporting the bottle and nipple in the casing until axially removed from the casing, an internally threaded one-piece metallic upper cap adapted to engage the threaded end of the casing, said cap having a comparatively sharp edge intermediate its ends of greater diameter than any other part of the upper cap to provide a finger grip portion, and an inner removable hollow cylindrical layer of compacted resilient cushioning material adapted to retain its shape during the handling thereof and inserted into the casing and filling the air-space around the bottle and engaging the inner lateral surface thereof substantially throughout the area of said inner surface.

3. Removable and totally enclosing enveloping and ventilating means for a nursing bottle having a nipple, including a one-piece metallic casing surrounding said bottle and out of contact with and unconnected to the major surface portion of said bottle, said casing being of its least diameter and being threaded at its upper end, a one-piece metallic nipple protector of double conical form and of the same diameter at its lower end as that of the casing and threaded at said lower end, said nipple protector being removably attached to said casing adjacent the junction of said nipple and said bottle, said nipple protector being of its greatest diameter intermediate its ends to provide a finger grip portion, said enveloping means being totally out of contact with and unconnected to said nipple, and said protector and said casing providing an intercommunicating air-space around the bottle and the nipple.

4. A totally enclosing and removable envelope for removable use with nipple-type nursing bottles generally having a narrow neck portion and for protecting said bottle and nipple from contamination and from mechanical injury and for retaining heat within said envelope, said envelope comprising a one-piece metallic casing conforming generally to the shape of said bottle and constricted to its least diameter adjacent said neck portion and spaced from all parts of said bottle except the bottom thereof, said casing having an opening at its lower end whereby said bottle may be inserted and removed, the constricted upper end of the casing having a rolled screw thread therein, a removable covering for said bottom opening, and a removable one-piece metallic nipple protector terminating at its lower end in a rolled screw thread engaging said casing adjacent the juncture of said bottle and said nipple, said envelope including said protector and said casing being totally out of contact with said nipple and providing an uninterrupted air-space completely around the bottle except at the bottom thereof.

5. A removable bottle-enclosing envelope adapted for removable use with a nursing bottle having a nipple comprising a one-piece metallic casing surrounding but spaced from the major part of said bottle, said spaced part including a hollow pad of removable, yieldable, soft, compacted cushion material in contact with substantially the entire inner surface of the casing, said casing having an opening at its lower end whereby said bottle and yieldable material may be inserted and removed, a removable cap for said opening, and a removable nipple protector removably engaging said casing at its upper end adjacent the juncture between said nipple and said bottle, said protector being of its greatest diameter intermediate its ends to provide a finger grip projecting part thereon, said enclosure being wholly out of contact with said nipple.

ANGELO DI GIULIO.